United States Patent [19]

Menzel

[11] Patent Number: 5,763,045

[45] Date of Patent: Jun. 9, 1998

[54] COMPOSITE ARTICLE AND METHOD OF FORMING A COMPOSITE ARTICLE

[75] Inventor: Gregory James Menzel, Lonsdale, Australia

[73] Assignee: Menzel Plastic Traders Pty. Ltd., Lonsdale, Australia

[21] Appl. No.: 603,312

[22] Filed: Feb. 20, 1996

[30] Foreign Application Priority Data

Feb. 20, 1995 [AU] Australia ............... PN1211

[51] Int. Cl.$^6$ ................................. B32B 9/00
[52] U.S. Cl. .................... 428/131; 428/33; 428/135; 428/137; 428/141; 428/198; 428/209; 428/247; 428/251; 428/327; 52/348; 52/454
[58] Field of Search .................. 48/256, 209, 137, 48/135, 141, 328, 327, 247, 33, 198, 131, 255, 251; 52/454, 348

[56] References Cited

U.S. PATENT DOCUMENTS 5,364,682 11/1994 Tanaka et al. ............... 428/138
5,477,652 12/1995 Torrey et al. ............... 52/309.13

*Primary Examiner*—Patrick Ryan
*Assistant Examiner*—Abraham Bahta
*Attorney, Agent, or Firm*—Evenson, McKeown, Edwards & Lenahan, P.L.L.C.

[57] ABSTRACT

A composite security screen and a method of producing such a screen. The screen has a sheet of metal mesh having bars and interstices between the bars and a plastics sheet material vacuum or pressure formed onto one side of the metal mesh such that the plastics material extends into the interstices of the metal mesh to form an inseparable composite security screen. The mesh may be an aluminium expanded mesh. The plastics material may be polycarbonate.

15 Claims, 1 Drawing Sheet

COMPOSITE ARTICLE AND METHOD OF FORMING A COMPOSITE ARTICLE

FIELD OF INVENTION

This invention relates to a composite article and a method of forming such a composite article and particularly to a composite article useful in the building trade.

The invention is particularly directed towards a security screen arrangement for domestic and commercial doors and windows.

BACKGROUND OF THE INVENTION

Security screens are usually some form of robust panel which can be fastened into a supporting frame and which are adapted to prevent entry or perhaps egress of persons from a particular area. The use of screens is often in doors and windows so that while access through the door or window is prevented light or air or both can enter a secured region.

There are situations, however, where while it is desirable to have a security screen to give a secure region and to allow light through the security screen it may be desirable not to allow air into that region. In the past such a dual requirement has been fulfilled by glass but for glass to be strong enough to provide the security element it is very expensive and can be very heavy.

To provide the dual function of security and restriction of air flow while still allowing light to pass through, therefore, it has been necessary to provide a separate security panel and translucent or transparent panel.

The security element can be provided by an expanded metal mesh and the translucent panel can be provided by a plastics material panel. It is not adequate, however, to merely to fasten the plastics sheet material on to one side of the expanded metal mesh because this provides a product which is not a single rigid article. It may rattle and it would be relatively straightforward for a person to separate the two articles.

It is the object of this invention to provide a security screen comprised of a composite article which will provide a security function as well as allowing light but not air into a secured region.

SUMMARY OF THE INVENTION

In one form therefore, the invention is said to reside in a composite security screen comprising a sheet of metal mesh having bars and interstices between the bars and a plastics sheet material vacuum or pressure formed onto one side of the metal mesh such that the plastics material extends into the interstices of the metal mesh to form the inseparable composite security screen.

It will be seen that by this invention that is provided a metal mesh which provides the security function of the article with a plastics sheet material formed onto the metal mesh so that it is inseparable from the metal mesh. The plastics material will form around the bars of the mesh to grip thereto.

The use of plastics material instead of glass is advantageous because glass has inherent breakage properties.

Preferably the expanded metal mesh is of a type which includes bars having undercuts on the side opposite to that on which the plastics material is formed such that the plastics material can be formed into the undercuts.

The bars may be circular, elliptical or diamond in cross sectional shape or any other convenient shape. These shapes are such as to include an undercut on the side of the panel so as to enable the softened plastics material sheet to form into the undercuts to form the composite shape.

Preferably the metal mesh panel is an expanded metal mesh.

By vacuum forming the plastics sheet material onto the metal mesh the sheet material actually extends against and preferably around the bars which make up the metal mesh and by doing so grips the bars not just in one or two places but all over the sheet thereby providing many points of gripping and hence a rigid composite security screen.

Such a rigid composite security screen can then be mounted into a suitable frame to provide a door or window as required.

The overall security screen has the advantage that it is still relatively light in weight and therefore still convenient to use as a panel in a door frame or as a panel in a window while it stops air entry and consequently insects or dust into the region secured.

In an alternate form the invention may be said to reside in a method of producing a composite security screen comprising the steps of providing a metal mesh panel of a type having bars and interstices between the bars, laying onto the metal mesh panel a sheet of thermoplastics material, heating the thermoplastics material, drawing the plastics material into interstices of the metal mesh by means of a vacuum or by pressure and allowing the plastics material to cool.

As discussed above, by this form of the invention a composite and inseparable article is produced which can be used for a security screen.

The metal mesh panel is preferably an aluminium expanded metal mesh panel. An example of such an expanded metal mesh is a "Viking" security mesh although many other configurations of metal mesh may be also used.

The plastics sheet material may be selected from polycarbonate, polymethyl methylate, polystyrene or any other suitable plastics material.

Preferably the plastics material is a polycarbonate sheet material and may have a thickness of 0.5–3 mm. Preferably the thickness is 0.75 mm. Polycarbonate is useful because of its high impact strength.

In one form of the method of the invention there may be provided a planar backing plate behind the expanded metal sheet during the vacuum forming process so that where the plastics sheet material is drawn through the interstices between the bars in the metal mesh panel it extends to the planar backing plate and is formed into planar portions in those interstices. Hence there is provided in the finished product planar portions in the interstices so that some degree of visibility through the panels is possible where a transparent plastics sheet material is used. The planar backing plate may have surface patterning so that the finished composite panel may have patterned planar portions in the interstices.

The metal mesh panels may have interstices or openings which are square, triangular, diamond shape or of any other regular or irregular convenient shape and may have interstices with sizes in the ranges of 25 mm up to 75 mm. The metal of the metal mesh material may be steel or aluminium or any other convenient metal. The metal mash panel may be formed by extrusion before expanding, by laser cutting from a metal sheet or by die casting.

In a preferred form of the invention the plastics sheet material may be used on the outside of the composite security screen, however, the plastics sheet material may be used on either inside or outside in the final installation.

3

This then generally describes the invention but to assist with understanding reference will be now made to the accompanying drawings which show a preferred embodiment of the invention.

DETAILED DESCRIPTION OF THE DRAWINGS

Figure 1:
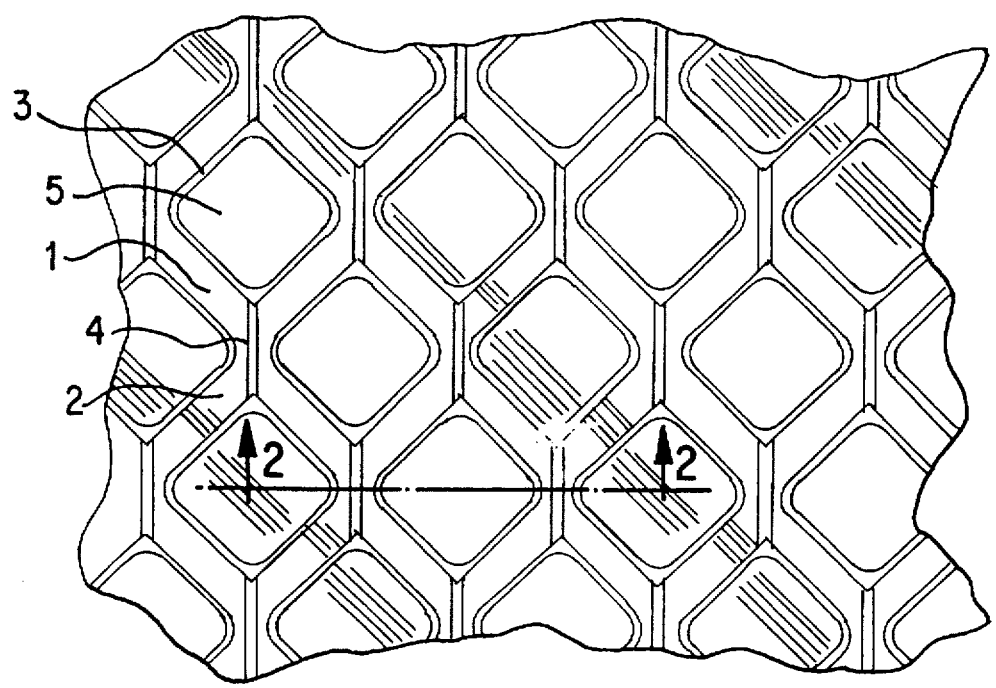
FIG. 1 shows a view of a expanded metal mesh panel with a plastics sheet material formed thereon of one embodiment of the invention.

Now looking more closely at the drawings and in particular FIG. 1 it can be seen that the expanded metal mesh 1 comprises a number of metal bars 2 bent at intervals defining between them a series of diamond shaped interstices 3 with joining regions 4 between the various bars 2. Into the interstices 3 between the joining regions 4 and extending over the bars 2 is a plastics sheet material 5. The sheet material has been vacuum or pressure formed over the mesh 1 against the bars 2 and joining regions 4 and into the interstices 3 to provide a conformed sheet which clamps onto the joining regions and also onto the bars to give the composite sheet of the invention.

Figure 2:
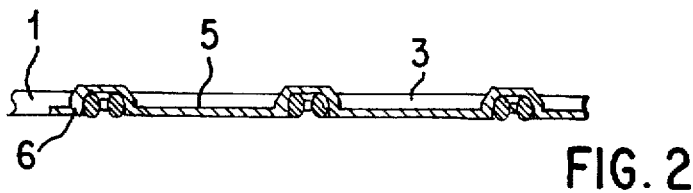
FIG. 2 shows a view of a portion of the cross section of the metal mesh and plastics sheet material along the line 2–2' in FIG. 1.

FIG. 2 shows the cross section 2–2' in FIG. 1. The metal bars 2 are of a substantially circular or elliptical shape and the plastics sheet material 5 particularly when cooling after vacuum forming has shrunk into the undercuts or recesses 6 at the base of the circular shape of the bar 2 to form a positive grip of the plastics sheet material on to the bars of the expanded metal mesh so as to provide a composite product.

Figure 3:
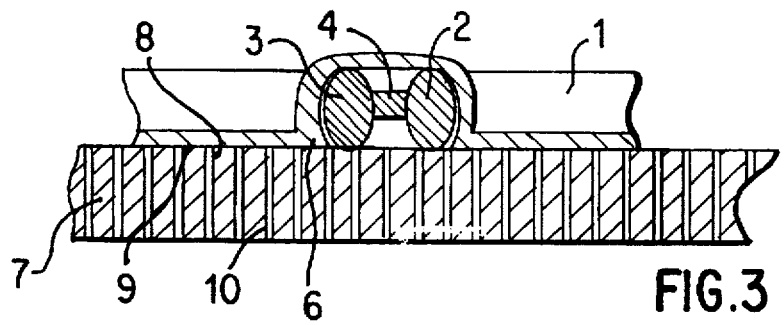
FIG. 3 shows an enlarged view of the cross section of one embodiment of the composite security screen of the present invention.

In FIG. 3 a detail of the vacuum or pressure forming process onto a metal bar of one embodiment of expanded metal mesh is shown. A planar backing plate 7 is placed behind the expanded metal sheet 1 during the vacuum forming process so that a planar surface 9 is formed in the region 8 of the sheet 5. The vacuum forming process is carried out by air being drawn through the apertures 10 in the backing plate 7 while the sheet 5 is heated to soften the sheet.

Figure 4:
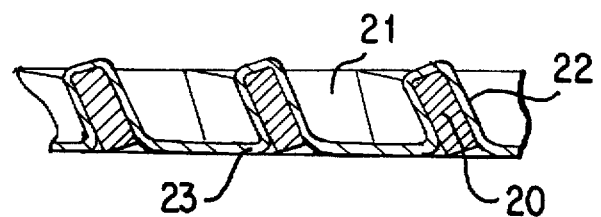
FIG. 4 shows an enlarged view of the cross section of an alternative embodiment of the composite security screen of the present invention.

In FIG. 4 a detail of the vacuum or pressure forming process onto the metal bars of another embodiment of expanded metal mesh is shown. In this embodiment the bars 20 of the expanded metal sheet 21 are substantially rectangular but angled and the plastics material 22 is vacuum or pressure formed so that it extends into the undercut 23 to provide a rigid connection of the two components to form the composite security screen of the invention.

Throughout this specification and the claims that follow unless the context requires otherwise, the words 'comprise' and 'include' and variations such as 'comprising' and 'including' will be understood to imply the inclusion of a stated integer or group of integers but not the exclusion of any other integer or group of integers.

I claim:

1. A composite security screen comprising a sheet of metal mesh having bars and interstices between the bars and a plastics sheet material vacuum or pressure formed onto one side of the metal mesh such that the plastics material extends into the interstices ad grips against the bars of the metal mesh to form the composite security screen wherein the plastics sheet material is selected from the group consisting of polycarbonate, polymethyl methacrylate, and polystyrene.

2. A composite security screen as in claim 1, wherein the plastics sheet material is a polycarbonate sheet material having a thickness in the range of from 0.5 to 3 mm.

3. A composite security screen as in claim 2 wherein the plastics sheet material has a thickness of 0.75 mm.

4. A composite security screen comprising a sheet of metal mesh having bars and interstices between the bars and a plastics sheet material vacuum or pressure formed onto one side of the metal mesh such that the plastics material extends into the interstices and grips against the bars of the metal mesh to form the composite security screen, wherein the metal mesh includes bars having undercuts on the side opposite to that from which the plastics material is formed such that the plastics material can be formed into the undercuts.

5. A composite security screen comprising a sheet of metal mesh having bars and interstices between the bars and a plastics sheet material vacuum or pressure formed onto one side of the metal mesh such that the plastics material extends into the interstices and grips against the bars of the metal mesh to form the composite security screen, wherein the metal mesh is aluminium.

6. A composite security screen comprising a sheet of metal mesh having bars and interstices between the bars and a plastics sheet material vacuum or pressure formed onto one side of the metal mesh such that the plastics material extends into the interstices and grips against the bars of the metal mesh to form the composite security screen, wherein the metal mesh is an expanded metal mesh.

7. A composite security screen comprising a sheet of metal mesh having bars and interstices between the bars and a plastics sheet material vacuum or pressure formed onto one side of the metal mesh such that the plastics material extends into the interstices and grips against the bars of the metal mesh to form the composite security screen, wherein the bars have a cross sectional shape selected from circular, elliptical or diamond.

8. A method of producing a composite security screen comprising the steps of providing a metal mesh panel of a type having bars and interstices between the bars, laying onto the metal mesh panel a sheet of thermoplastics material, heating the thermoplastics material, drawing the plastics material into the interstices of the metal mesh panel by means of a vacuum or pressure and allowing the plastics material to cool.

9. A method as in claim 8 further including the stop of providing a planar backing plate behind the metal mesh panel during the vacuum or pressure forming process so that where the plastics sheet material is drawn through the interstices between the bars in the metal mesh panel it extends to the planar backing plate and hence provides in the finished product planar portions of the thermoplastics material in the interstices.

10. A method as in claim 8 wherein the plastics sheet material is selected from the group consisting of polycarbonate, polymethyl methacrylate, and polystyrene.

11. A method as in claim 8 wherein the metal mesh panel is an expanded metal mesh.

12. A method as in claim 8 wherein the bars have a cross sectional shape selected from circular, elliptical or diamond.

13. A composite security screen comprising a sheet of metal mesh having bars and interstices between the bars and a plastics sheet material vacuum or pressure formed onto one side of the metal mesh such that the plastics material extends into the interstices and grips against the bars of the metal mesh to form the composite security screen, wherein the plastics sheet material has a thickness which is less than a thickness of said sheet of metal mesh.

14. A method as in claim 8, wherein the plastics sheet material has a thickness which is less than a thickness of said metal mesh panel.

15. A method as in claim 8, wherein the plastics material is drawn into the interstices of the metal mesh by means of a vacuum.

* * * * *